(12) United States Patent
Peña Valcárcel

(10) Patent No.: US 6,982,382 B2
(45) Date of Patent: Jan. 3, 2006

(54) DEVICE FOR SEALING DUCTS OF ELECTRIC AND TELEPHONE LINES

(75) Inventor: Felipe Peña Valcárcel, Valencia (ES)

(73) Assignee: Matrival, S.L., Beniparrell (ES)

( * ) Notice: Subject to any disclaimer, the term of this patent is extended or adjusted under 35 U.S.C. 154(b) by 0 days.

(21) Appl. No.: 10/860,897

(22) Filed: Jun. 3, 2004

(65) Prior Publication Data

US 2004/0232628 A1 Nov. 25, 2004

Related U.S. Application Data

(63) Continuation of application No. PCT/ES02/00583, filed on Dec. 9, 2002.

(51) Int. Cl.
*H02G 3/04* (2006.01)
*F16L 17/00* (2006.01)

(52) U.S. Cl. .................. 174/68.1; 174/72 A; 174/21 R; 285/95; 277/602

(58) Field of Classification Search .............. 174/21 R, 174/47, 19, 24, 25 G, 26 G, 65 R, 65 SS, 174/68.1, 68.3, 72 A, 77 R, 17 CT; 285/95, 285/97, 335; 439/271, 559; 277/602, 314
See application file for complete search history.

(56) References Cited

U.S. PATENT DOCUMENTS

| | | | | |
|---|---|---|---|---|
| 4,790,544 | A | * 12/1988 | Kemp | .......................... 277/314 |
| 5,131,433 | A | 7/1992 | Sion et al. | |
| 5,413,136 | A | 5/1995 | Prescott | |
| 5,560,618 | A | 10/1996 | Wambeke et al. | |
| 5,901,962 | A | 5/1999 | Wambeke | |
| 6,361,054 | B1 * | 3/2002 | Denker et al. | .............. 277/630 |
| 6,581,938 | B2 * | 6/2003 | McKenrick | ................. 277/314 |

FOREIGN PATENT DOCUMENTS

| EP | 1 217 288 A1 | 6/2002 |
|---|---|---|
| ES | 2168770 | 6/2002 |
| FR | 2617572 | 6/1989 |

\* cited by examiner

*Primary Examiner*—Angel R. Estrada
(74) *Attorney, Agent, or Firm*—Klauber & Jackson LLC

(57) ABSTRACT

The present invention comprises a rectangular sheet with folding lines and a perimetric strip that facilitates adhering or welding thereof, and the forming of a bag-type closed compartment, inside of which there is a small tank loaded with a pressurized gas. The outlet hole of the tank can be opened from the outside, in order to let the gas escape and cause gradual and slow inflation of the compartment formed by the folded sheet, once it has been arranged around the main at the of a tube or conduit, thereby adhering to the walls of both elements during inflation.

4 Claims, 4 Drawing Sheets

A-B

A-B

C-D

E-F

DEVICE FOR SEALING DUCTS OF ELECTRIC AND TELEPHONE LINES

RELATED APPLICATIONS

The present application is a Continuation of co-pending PCT application Ser. No. PCT/ES02/00583, filed Dec. 9, 2002. Applicant claims the benefits of 35 U.S.C. §120 as to the PCT application and the entire disclosure of the application is incorporated herein by reference in its entirety.

OBJECT OF THE INVENTION

As expressed in the present title of this specification, the present invention consists of a device for sealing mains of electric and telephone lines and the like, thanks to which it is possible to seal the end of mains sealing the entire diameter thereof in order to prevent foreign objects that partially or totally obstruct the mains from entering because this would make it unserviceable, or else, it would cause failures and breakdowns in the installation, due to the entry of water, mud, soil, stones, etc. Likewise, this also prevents rodents and other animals that could likewise cause cutoffs or failures from entering.

The sealing device is likewise applicable to empty or unused ducts in order to prevent them from becoming blocked up, as well as for sealing the circular crown defined in the tubing section between the wall thereof and the outlet of the telephone and electric line, etc. In any case, the device is mounted on the end of the tubing and it is easily removed when the operator needs to do so.

BACKGROUND OF THE INVENTION

Currently there are numerous pneumatic devices in order to seal mains or tubings by the expansion of any of its parts upon receiving the pressure of a fluid inside.

In all of these cases, the pressure to expand and seal the desired area is supplied by means of some auxiliary connections or conduits that communicate the inside of the expandable element with a pressurized source controlled by the operator of the device.

Once the sealing device has been placed in the corresponding area, the expandable element is connected with the pressure source that progressively injects into it the expanding fluid until by means of visual reading means (pressure gage), or by the same appearance or expansion achieved, the pressure source is closed and the disconnection of the sealing device is proceeded with.

The problems posed by this operation are obvious:

The inflating is done by the control of an operator who must follow closely the applied pressure and make sure that the inflating of the seal really takes place.

A connecting-disconnecting process that taking into account the location of these seals (meter boxes, ducting channels, etc.) should be carried out and on occasions this poses serious difficulties.

Time is used in the filling process, which should not be done rapidly because the seal may not adapt adequately to the interstice that it should close up.

DESCRIPTION OF THE INVENTION

In broad outline, the device for sealing mains of electric and telephone lines and the like, object of the invention, consists essentially of a preferably rectangular shaped sheet, with folding lines for folding thereof by overlapping of the longitudinal edges, having a peripheral marginal area that will constitute the welding or adhering strip once the folding of the sheet along the folding lines has been proceeded with. Prior to this sealing operation in order to form a bag-type closed inside compartment, a small tank loaded with pressurized is placed inside, duly fastened to one of the walls thereof. The tank has a outlet hole or mouth that can be opened by actuating from the outside in order to achieve the inflating of the compartment.

The tank loaded with a pressurized gas has means to strike it or open it, in such a way that it lets the gas escape gradually and slowly in order to fill the sealing device, once the same has been placed at the outlet of the main and around the electric line or the like, in the event that it exists.

In order to seal the interstices that might remain unsealed, they are caulked conventionally with putty that is previously applied to the surfaces of the seal and that become molded during inflation.

When the main is to be used to introduce a new run of wiring, telephone line or the like, it suffices to perforate the wall of the inflated compartment so that same deflates, becoming unserviceable.

The material that the sealing device is made out of is very varied although preferably it will be formed by the attachment of the plastic and metal layers comprising the sheet and that make it resistant, waterproof and at the same time flexible, so that it may adapt to the cylindrical contours to be sealed.

Since on occasions it happens that the ring-shaped space between the wad of conductor cables and the walls thereof is too small to house a gas tank that contains enough gas for correct inflation, use of compound tanks connected to one another has been provided for so that there is only one opening hole from the outside. For these cases it has also been provided for that the tank has flexible and very elongated walls, with a zigzag shape, for better adaptation thereof to the cylindrical contour.

In order to provide a better understanding of the characteristics of the invention and forming an integral part of this specification, some sheets of drawings in whose figures the following has been represented in an illustrative and non-restrictive manner, are attached hereto:

DESCRIPTION OF THE PREFERRED EMBODIMENT

Making reference to the numbering used in the figures, we can see how the device for sealing mains of electric and telephone lines and the like, that the invention proposes, is comprised of a rectangular sheet (1) provided with folding lines (2) in the center area, for the folding thereof in such a way that the edge of one of the side laps that is placed over the edge of the other lap, the contour being sealed by means of adhering or welding along the perimetric strip (3) provided for this purpose.

Figure 1:
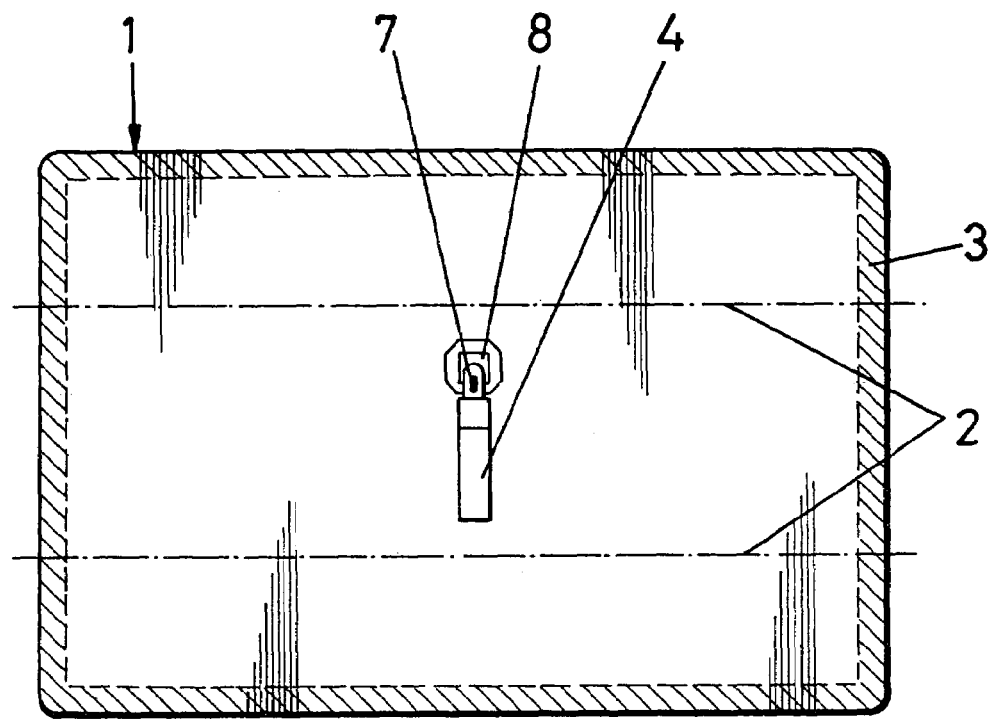
FIG. 1 is a plan view of the development of the sheet forming the device for sealing mains of electric and telephone lines and the like, object of the invention, including the pressurized gas tank that is fastened to an area thereof.

Before proceeding with the sealing of the compartment formed by the folded and closed up sheet (1), the small tank (4) containing pressurized gas, which once open is to invade this compartment is placed in the inside duly fastened to the center wall of the sheet (1) and preferably to the middle area as shown in FIG. 1. Once the device has remained located in the end of the tubing and wound around the electric main, just as it is observed in FIG. 4. The conduit or tubing has reference number (5) and the electric main or the like has reference number (6).

The tank (4) containing the pressurized gas (4) has an outlet hole (7) that, once open, will let the gas escape towards the inside of the inflatable compartment formed or the seal itself, gradually and slowly as we have described at the beginning of this specification.

Reference (8) designates the means for breaking the gas outlet, or opening of the outlet hole (7), an operation which is carried out by the operator from the outside, at the appropriate moment when it is perfectly placed in the end of the tubing that is to be sealed.

Figure 2:
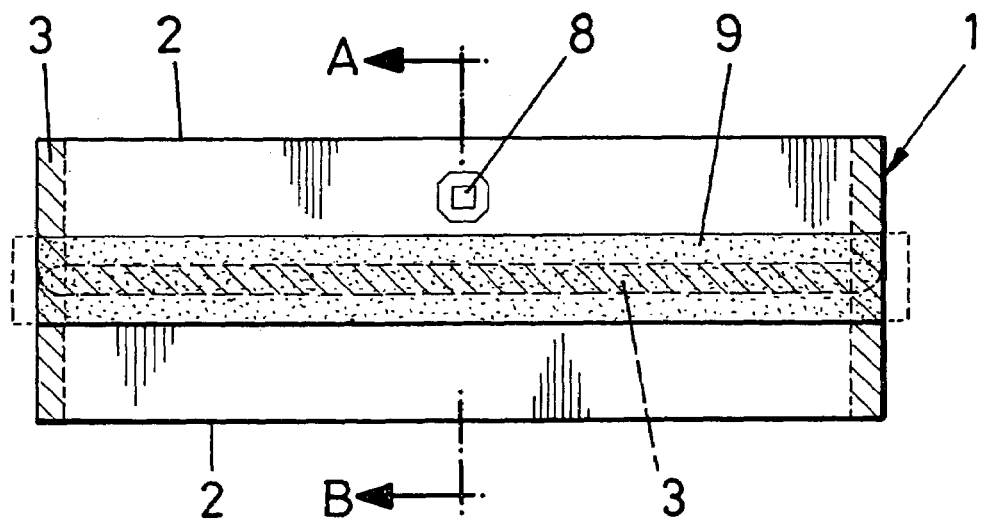
FIG. 2 is a plan view of the sealing device itself, once folded and closed up forming an inflatable compartment.
Figure 3:
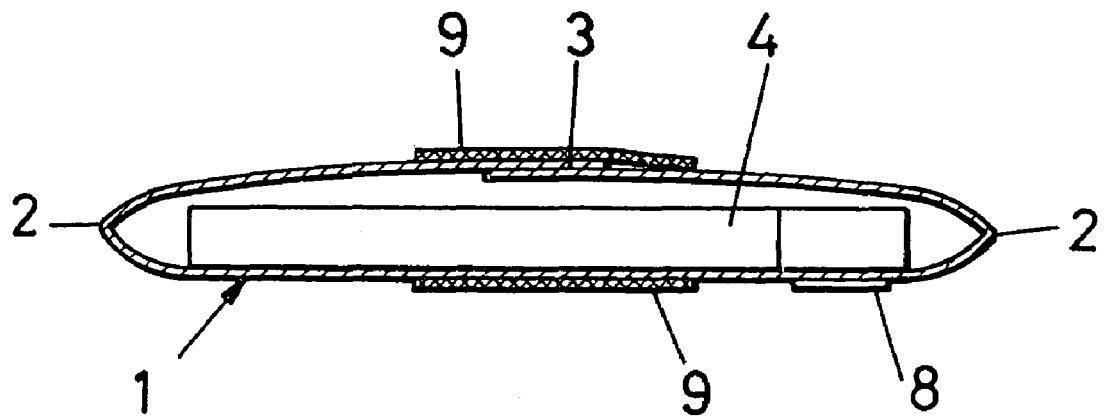
FIG. 3 is a section taken on line A-B of FIG. 2.

In FIG. 2 one can see how the means for breaking (8) the hole (7) are visible from the outside.

Figure 4:
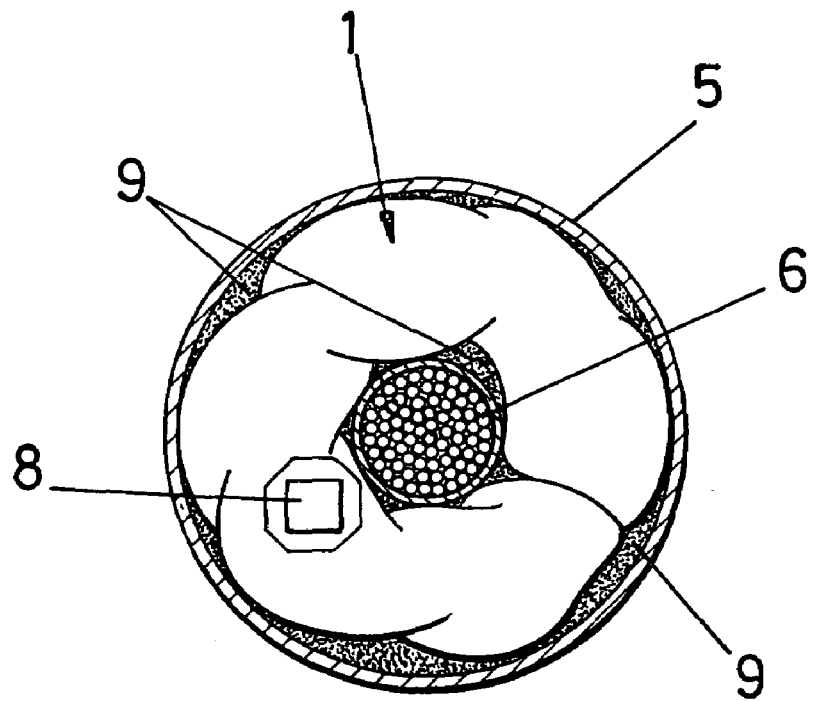
FIG. 4 is a sectioned view of a main of an electric line, in an end thereof where the device for sealing means of electric and telephone lines and the like, object of the invention, is located in a position wherein it effectively carries out its sealing task.

In this same FIG. 2 number (9) refers to the sheet of putty placed longitudinally on both surfaces of the device, thus perfectly closing up the interstices that could be formed when inflating the device, as one can see in FIG. 4. The putty (9) is distributed to perfectly caulk the hollow spaces of the cylindrical wall of the tubing (5), as well around the electric main (6).

Figure 5:
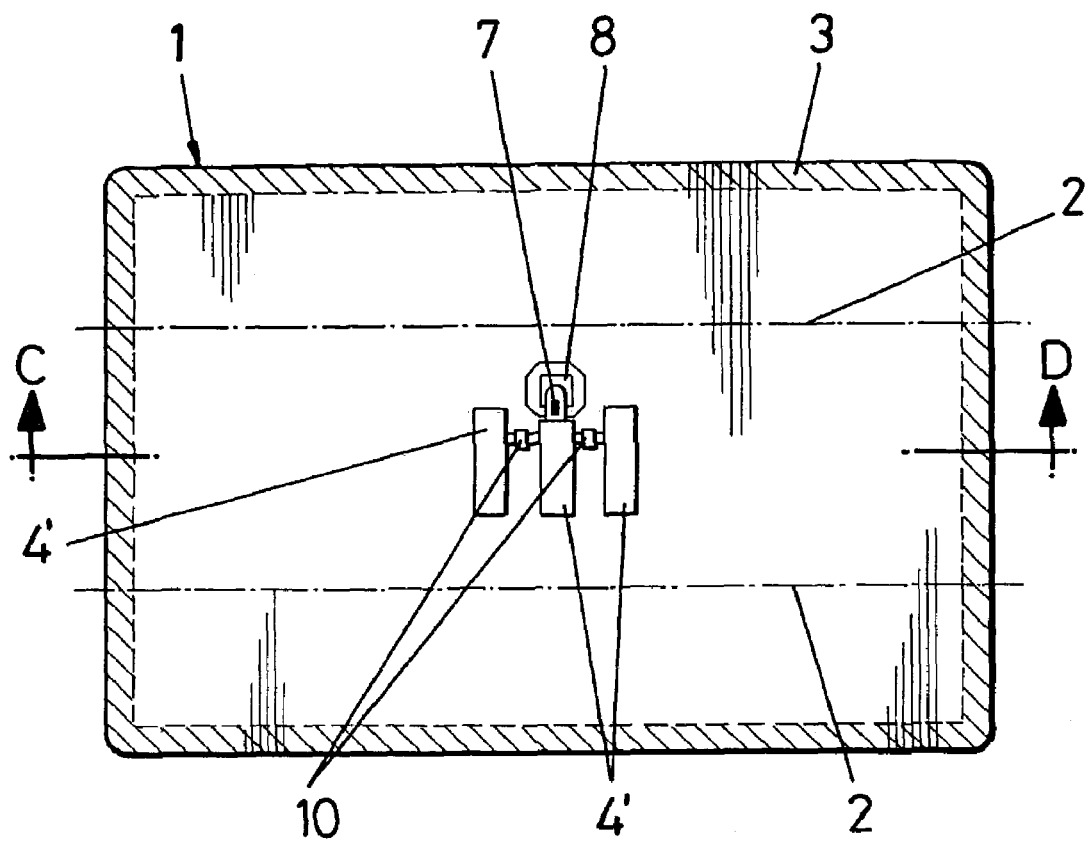
FIG. 5 is a view similar to FIG. 1, using a tank comprised of multiple elements connected to each other, with a smaller diameter.
Figure 6:
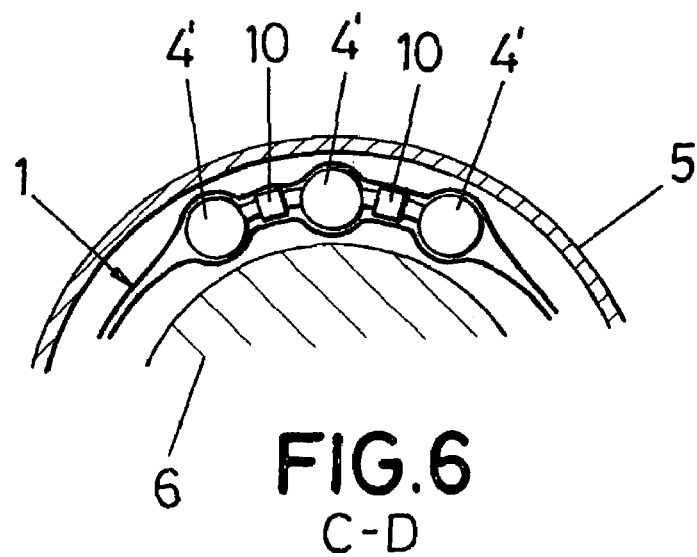
FIG. 6 is a partial section taken on line C-D of FIG. 5, being adapted to the main that is to be sealed.

Making special reference to FIGS. 5 and 6, we can see the structure of a gas tank formed by several elements (4') connected to each other by some flexible conduits (10) in order to adapt to the curvature of the conduit or tubing (5) and to that of the inside main (6). Only the center element (in this example) is provided with means for breaking (8) the hole (7).

This device is especially applicable in the cases wherein the ring-shaped chamber to be sealed is too slim and the seal (4) of FIG. 1 does not fit correctly. If a simple but smaller seal were used, the volume of gas would not be sufficient.

Figure 7:
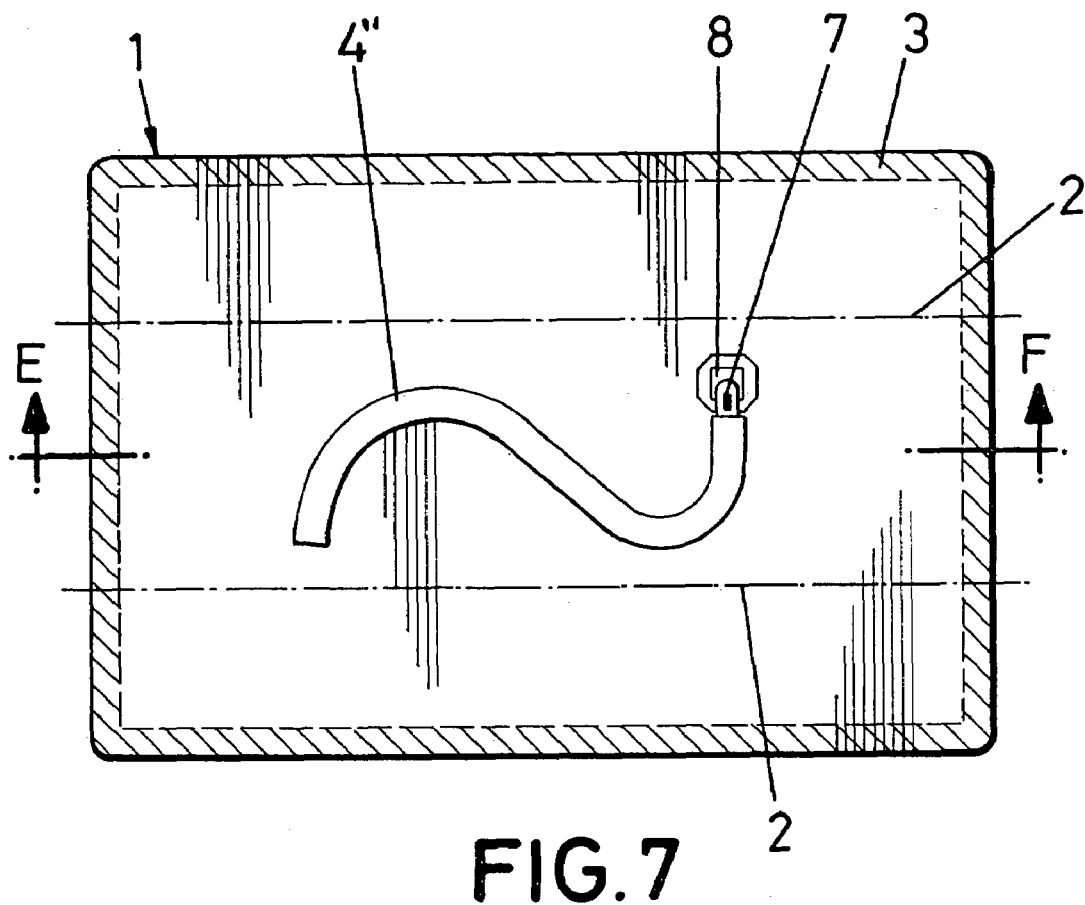
FIG. 7 is a view similar to FIG. 1, using a flexible tank with a small diameter and long length for better adaptation thereof.
Figure 8:
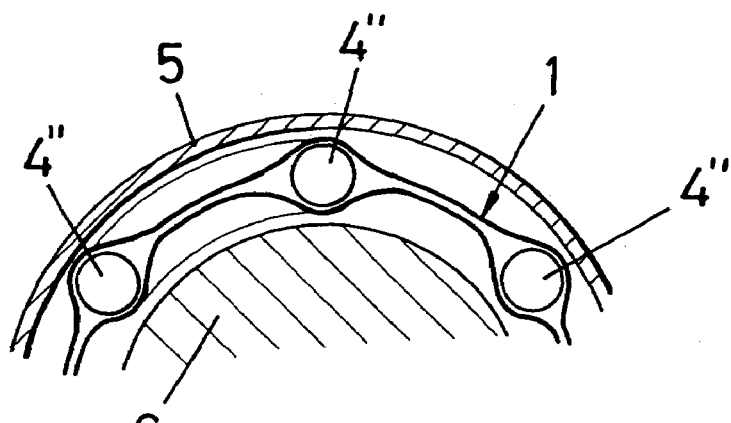
FIG. 8 is a partial section taken on line E-F of FIG. 7, being adapted to the main that is to be sealed.

Another solution proposed to solve the same problem, is seen in FIGS. 7 and 8. The tank has reference number (4") and although it is unique, it has a flexible structure with a small diameter but long length with respect to the section thereof, also having a zigzag arrangement that optimizes its adaptation to the cylindrical contour of the walls of the chamber.

What is claimed is:

1. Device for sealing ducts of electric and telephone lines, and more specifically the end of the conduit or tubing through which the duct comes out, wherein it consists of a rectangular sheet with folding lines and provided with a perimetric strip that facilitates its adhering or welding forming a bag-type closed compartment, inside of which there is a small tank loaded with a pressurized gas, said tank being provided with a means for opening from the outside, of its outlet hole or mouth in order to let the gas escape and cause gradual and slow inflation of the compartment formed by the folded sheet and once arranged around the main in the end of the tubing or conduit, both elements adhering to walls during inflating.

2. Device for sealing ducts of electric and telephone lines, according to claim 1, wherein the tank is formed by various elements connected to each other by small elastic conduits, for better adaptation thereof to the cylindrical walls and dimensions of a ring-shaped chamber to be sealed.

3. Device for sealing ducts of electric and telephone lines, according to claim 1, wherein the gas tank is flexible, has a small diameter and long length for better adaptation thereof to the cylindrical walls and dimensions of a ring-shaped chamber to be sealed.

4. Device for sealing ducts of electric and telephone lines, according to claim 3, wherein the tank has a zigzag shape.

* * * * *